Sept. 17, 1940.     E. F. URBAN     2,215,339
ADJUSTABLE GREASE FITTING
Filed Aug. 15, 1938

Inventor
Ernest F. Urban
John F Brezina
Atty.

Patented Sept. 17, 1940

2,215,339

UNITED STATES PATENT OFFICE 2,215,339

ADJUSTABLE GREASE FITTING

Ernest F. Urban, Cicero, Ill.

Application August 15, 1938, Serial No. 224,957

2 Claims. (Cl. 184—105)

This invention is directed to a grease fitting adapted to be mounted in various locations on machinery, apparatus or the like, to provide means for conveniently introducing a grease lubricant to the various bearings, or other friction surfaces.

More particularly, it is directed to a novel fitting for introduction of grease lubricant having adjustable nipple releasably and adjustably mounted with respect to the body of the fitting so that it may be turned and secured in the desired direction and at the desired angle with respect to the fitting and with respect to the most convenient means of access thereto.

It is well known that in connection with large machinery as well as various types of vehicles, when the common and ordinary type of elbow fitting is screwed into a threaded aperture over or adjacent the bearing surface to be lubricated, it is necessary, and highly desirable, that the body of the fitting be screwed tightly into the threaded aperture provided for the introduction of grease or the like, and that when such ordinary presently-known elbow fitting is screwed until it is tight, that the angular solid nipple will in numerous cases, point in a direction opposite or substantially opposite to the direction from which access with a grease gun nozzle is possible. This is especially true in large machinery, such as printing presses, as well as in various locations upon the chassis of an automobile. Further, it is well known that frequently the threaded grease inlet is formed relatively close to other parts of the machine, and when the ordinary elbow grease fitting is screwed thereinto until it is right, the angular portion will point toward an obstructing part of the machine to prohibit periodical mounting of the nozzle thereon. This is further objectionable in that when these frequent conditions occur, it is necessary to unscrew and loosen the body of the grease nipple so that the angular portion thereof will point in a direction from which it is possible to mount the pressure grease gun nozzle, this resulting in frequent loss of the entire fitting because of its rattling and turning out due to the vibration and shocks of the operating machine, especially in the chassis of various vehicles.

My invention has for its object the provision of a novel and adjustable grease fitting which eliminates all the foregoing objectionable features, in that it provides a unit which includes an angularly adjustable nipple which is removable separately from the body of the grease fitting, and which may be secured in any desired angular position and direction after the body of the grease nipple is screwed tightly into permanent position in the threaded grease inlet provided for the introduction of lubricant to the bearing surface.

A further object of my invention is the provision of a grease fitting having a body portion and a nipple portion separate from each other, the nipple having a ball shaped portion mounted for rotation and angular positioning with respect to the body portion, and a spring operated ball valve in said nipple to prevent backing up of the introduced grease.

Other and further important objects of the invention will be apparent from the following description and claims.

The invention (in a preferred form) is described in the following specification and illustrated in the accompanying drawing.

Figure 1:
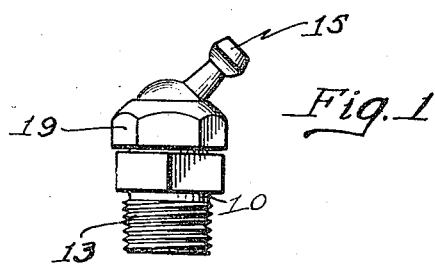
Fig. 1 is a side elevational view of a complete assembled grease fitting embodying my invention.

Reference numeral 10 designates a substantially cylindrical metal body having an intermediate nut portion 11 defined by a wrench-engaging surface which in the illustration is a hexagon. The upper end thereof has external threads 12 and the lower integral portion has external threads 13 which provide means whereby the fitting may be threadingly mounted in a threaded aperture over or adjacent a bearing or other friction surfaces requiring frequent lubrication. Numeral 14 designates the central longitudinal passage in body 10, the annular inner wall of which is enlarged or formed concavely as clearly illustrated in Fig. 2.

Figure 2:
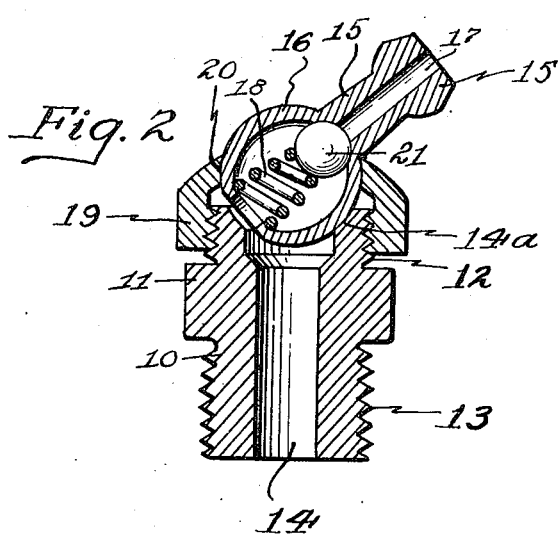
Fig. 2 is an enlarged vertical cross sectional view thereof.
Figure 3:
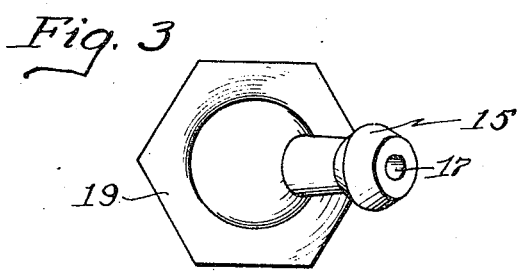
Fig. 3 is an enlarged top plan view thereof.

The nipple portion of my fitting comprises a centrally passaged stud portion 15 whose enlarged end or head is adapted to be suitably gripped by gripping means of the grease gun nozzle, and comprises also the integral ball-shaped portion 16. The central passage 17 extends through stud 15 and through said ball-shaped portion 16 as shown in Fig. 2, and the same emerges with and terminates in the inner rounded chamber as indicated in said Fig. 2. At the entrance to the "neck" of the stud 15 an annular recess is formed to form a ball valve seat against which a steel ball valve 21 is normally held by a helical compression spring 18. The lower end of compression spring 18 is preferably enlarged and seats against the inside surface of the portion of the metal wall surrounding the outlet opening.

Numeral 14a designates an annular recess at the upper end of passage 14 which forms a cup-like seat which is of a shape conforming to the shape of the lower portions of the ball portion 16. When the bushing 19 is screwed down tightly to secure the nipple in desired position, the rounded portion of the recess 14a fits snugly against the surface of the ball portion 16 to form a tight seal at all times.

The use of nipples embodying my invention eliminates the objectionable mounting of nipples to point in the wrong and inaccessible direction when screwed tightly upon machinery and apparatus and the like where access to the various parts is restricted and difficult. It further insures that the fitting may be tightly screwed in to the lubrication inlet provided, and thereafter permitting angular mounting and positioning of the nipple to the most convenient and desirable direction, thus saving considerable time and work in the lubrication of various machinery, or portable or stationary installations where a large number of lubrication inlets are close together at points frequently remote from the actual bearing with which they are communicatively connected.

A bushing 19 having internal threads as shown is adapted to thread on the upper threads 12 to the desired tightness. The upper aperture through the cap of said bushing is defined by a relatively sharp annular ridge or flange 20 whose diameter is less than the diameter of the ball portion 16, the beveled edge of said flange forming a tight or snug fit with the surface of said ball portion though permitting its rotation when the bushing 19 is not tightened down.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a fitting for introducing lubricant to a bearing, a body formed with a longitudinally extending passage having its upper portion enlarged and upper marginal portions of the walls thereof formed with a concaved circumferentially extending transversely arcuate seat, said body having its upper and lower portions externally threaded and between the threaded portions being formed with a wrench-engaging portion, a nipple having a hollow ball-shaped lower portion resting upon said seat and having an opening at its bottom for communicating with the passage of the body, a neck extending from the ball-shaped lower portion and having a longitudinally extending passage opposite the opening and an annular valve seat surrounding its inner end within the said ball-shaped lower portion, a valve ball in the ball-shaped lower portion, a spring in the ball-shaped lower portion surrounding the opening thereof and engaging the valve ball to yieldably hold the ball against the valve seat in closing relation to the inner end of the passage of said nipple, and a collar fitting snugly about the ball-shaped lower portion and screwed upon the upper portion of said body to mount the nipple for universal tilting adjustment.

2. In a fitting for introducing lubricant to a bearing, a body threaded for engagement in an opening of a bearing and formed with a longitudinally extending lubricant passage and a concaved seat surrounding the upper end of the passage, a nipple having a hollow ball-shaped base resting upon said seat and formed with an opening communicating with the passage, a neck extending upwardly from the base and formed with a longitudinally extending lubricant passage leading from the interior of the base and at its lower end surrounded by a valve seat, a valve in said base yieldably held closed against the valve seat, and a collar fitting snugly about the base and screwed upon the upper portion of said body to hold the nipple in place and permit universal tilting adjustment of the nipple.

ERNEST F. URBAN.